United States Patent
Jin et al.

(10) Patent No.: US 12,094,093 B2
(45) Date of Patent: Sep. 17, 2024

(54) IMAGE DESCATTERING METHOD BASED ON ITERATIVE OPTIMIZATION OF ATMOSPHERIC TRANSMISSION MATRIX

(71) Applicant: Tsinghua Shenzhen International Graduate School, Guangdong (CN)

(72) Inventors: Xin Jin, Guangdong (CN); Yihui Fan, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 397 days.

(21) Appl. No.: 17/697,948

(22) Filed: Mar. 18, 2022

(65) Prior Publication Data

US 2022/0207661 A1      Jun. 30, 2022

Related U.S. Application Data

(63) Continuation of application No. PCT/CN2021/123321, filed on Oct. 12, 2021.

(30) Foreign Application Priority Data

Nov. 25, 2020   (CN) .......................... 202011337360.2

(51) Int. Cl.
   *G06T 5/00*   (2024.01)
   *G06T 5/50*   (2006.01)
   (Continued)

(52) U.S. Cl.
   CPC .................. *G06T 5/73* (2024.01); *G06T 5/50* (2013.01); *G06T 7/521* (2017.01);
   (Continued)

(58) Field of Classification Search
   CPC .. G06T 5/73; G06T 5/50; G06T 7/521; G06T 2207/10028; G06T 2207/20132;
   (Continued)

(56) References Cited

U.S. PATENT DOCUMENTS

| | | | |
|---|---|---|---|
| 2018/0122051 A1* | 5/2018 | Li | ............................. G06T 5/20 |
| 2019/0089869 A1* | 3/2019 | Fleizach | .............. H04N 1/6027 |

(Continued)

FOREIGN PATENT DOCUMENTS

| | | |
|---|---|---|
| CN | 104318528 | 1/2015 |
| CN | 109903239 | 6/2019 |
| CN | 111598791 | 8/2020 |

*Primary Examiner* — Iriana Cruz
(74) *Attorney, Agent, or Firm* — Winston Hsu

(57) ABSTRACT

Disclosed is an image descattering method based on iterative optimization of an atmospheric transmission matrix, including steps: S1, constructing a descattering model based on the atmospheric transmission matrix; S2, estimating a forward scattering coefficient q corresponding to a foggy day image B; S3, based on a depth map T of the foggy day image B and the forward scattering coefficient q obtained in the step S2, estimating an initial atmospheric transmission matrix A; and S4, substituting the estimated initial atmospheric transmission matrix A into the descattering model in the step S1, and performing iterative update under a constraint condition, until a value of the descattering model satisfies a convergence condition, to obtain an optimal atmospheric transmission matrix A* and an optimal descattered image X*. The image descattering method based on the iterative optimization of the atmospheric transmission matrix provided by the present application is based on the atmospheric transmission matrix.

10 Claims, 3 Drawing Sheets

(51) Int. Cl.
  *G06T 5/73*     (2024.01)
  *G06T 7/521*    (2017.01)
(52) U.S. Cl.
  CPC ............... *G06T 2207/10028* (2013.01); *G06T 2207/20132* (2013.01); *G06T 2207/20221* (2013.01); *G06T 2207/30192* (2013.01)
(58) Field of Classification Search
  CPC . G06T 2207/20221; G06T 2207/30192; G06T 5/77; G06T 7/50; G06T 5/90; Y02T 10/40; G06F 17/16
  See application file for complete search history.

(56) References Cited

U.S. PATENT DOCUMENTS

| | | | |
|---|---|---|---|
| 2020/0290503 A1* | 9/2020 | Kawata | B60Q 1/20 |
| 2020/0342575 A1* | 10/2020 | Itoh | G06T 5/73 |
| 2021/0173120 A1* | 6/2021 | Peters | G01W 1/12 |
| 2022/0028118 A1* | 1/2022 | Kim | G06V 20/52 |
| 2022/0222497 A1* | 7/2022 | Jin | G01J 3/28 |
| 2023/0421872 A1* | 12/2023 | Martínez Corral | H04N 25/47 |

* cited by examiner

IMAGE DESCATTERING METHOD BASED ON ITERATIVE OPTIMIZATION OF ATMOSPHERIC TRANSMISSION MATRIX

CROSS REFERENCE TO RELATED APPLICATIONS

This application is a continuation application of PCT Application No. PCT/CN2021/123321, filed on Oct. 12, 2021. The content of the application is incorporated herein by reference.

BACKGROUND OF THE INVENTION

1. Field of the Invention

The present application relates to the field of optical and digital image processing, in particular to an image descattering method based on iterative optimization of an atmospheric transmission matrix.

2. Description of Related Art

In real life, haze weather is widespread, dust, fog and other particles in the atmosphere may lead to the occurrence of a scattering phenomenon, so that details and brightness information of an image are lost largely, the greater influence is caused to an imaging device, and the visual effect of the image is reduced. At present, existing descattering algorithms are divided into two categories: one type is an image enhancement method based on image processing, such as histogram equalization, Fusion, Retinex and other methods, although this type of the methods may improve the visual effect of the image, the effect is not good while the haze concentration is relatively large, and only the color of the image is restored better; and the other type is a model-based image restoration method, such as dark channel prior, Haze-Line and other methods, this type of the methods consider a physical model of atmospheric scattering and may restore the image better, but because the applied model thereof is much approximated, there is a larger difference from the real atmospheric environment, and the restoration performance thereof is limited.

Because a real atmospheric model is very complicated, it is extremely difficult to solve and measure, and the existing methods may not be really applied to the atmospheric descattering, and there is a larger deviation in direct solution using a simplified model.

SUMMARY OF THE INVENTION

A purpose of the present application is to provide an image descattering method based on iterative optimization of an atmospheric transmission matrix in order to solve a problem in the prior art that the distortion of an image obtained by using a simplified approximate model is relatively large.

The image descattering method based on the iterative optimization of the atmospheric transmission matrix provided by the present application includes the following steps: S1, constructing a descattering model based on the atmospheric transmission matrix; S2, estimating a forward scattering coefficient q corresponding to a foggy day image B; S3, based on a depth map T of the foggy day image B and the forward scattering coefficient q obtained in the step S2, estimating an initial atmospheric transmission matrix A; and S4, substituting the estimated initial atmospheric transmission matrix A into the descattering model in the step S1, and performing iterative update under a constraint condition, until a value of the descattering model satisfies a convergence condition, to obtain an optimal atmospheric transmission matrix A* and an optimal descattered image X*.

Preferably, the descattering model in the step S1 is $\min\|AX-B\|_2$, herein, A is the initial atmospheric transmission matrix, X is an initial descattered image of the foggy day image B, and B is the foggy day image.

Preferably, the method for estimating the forward scattering coefficient q in the step S2 includes: S21, comparing the foggy day image B with the initial descattered image X, to obtain an atmospheric type of a shooting site of the foggy day image B; and S22, using a fog concentration evaluation model to obtain the forward scattering coefficient q.

Preferably, the acquisition method for the initial descattered image X of the foggy day image B is one of a dark channel prior dehazing algorithm, a Haze-Line prior algorithm, a Retinex image enhancement algorithm and a Fusion algorithm.

Preferably, the method for estimating the initial atmospheric transmission matrix A in the step S3 includes: S31, constructing an atmospheric point spread function $APSF_{x_0 y_0}$ of a pixel in the foggy day image B:

$$APSF_{x_0,y_0} = \frac{e^{-\frac{(x^2+y^2)^{\frac{kT_{xy}}{2}}}{\left|A\left(kT, \frac{1-q}{q}\right)\right|^{kT_{xy}}}}}{4\Gamma^2\left(1+\frac{1}{kT_{xy}}\right) A\left(kT_{xy}, \frac{1-q}{q}\right)^2}$$

$$A(p, \sigma) = \left[\sigma^2 \Gamma\left(\frac{1}{p}\right) \Big/ \Gamma\left(\frac{3}{p}\right)\right]^{\frac{1}{2}}$$

Herein, $\Gamma(\cdot)$ is a gamma function, k is an adjustment factor, x and y are deviations of a pixel to be calculated and a center point coordinate, T is a depth map, $T_{xy}$ is depth information corresponding to the pixel in the depth map T, q is the forward scattering coefficient, and p and $\sigma$ are two input variables of a function $A(\cdot)$; S32, performing sparsification on the atmospheric point spread function of the pixel; S33, according to a coordinate of the pixel in the foggy day image B, filling a center point of the atmospheric point spread function after the sparsification corresponds to a pixel point in the corresponding foggy day image B, cropping a part beyond the foggy day image B, and fullfilling the rest part with a zero; S34, expanding the calculated atmospheric point spread function of the pixel in columns; S35, repeating the steps S31~S34, to obtain the atmospheric point spread function of each pixel in the foggy day image B and expanding it respectively in columns; and S36, stacking all the columns in the step S35 according to a sequence of the pixels, and generating the initial atmospheric transmission matrix A.

Preferably, the method for performing the sparsification on the atmospheric point spread function of the pixel in the step S32 includes: setting an extraction width, and center-extracting a new matrix from the generated atmospheric point spread function, wherein a side length of the new matrix is equal to the set extraction width, so as to achieve the sparsification of the atmospheric point spread function.

Preferably, the step S4 includes: S41, according to a first type of the constraint condition, correcting the atmospheric transmission matrix on each depth layer, to obtain an atmospheric transmission matrix $A_i$ corrected by the current $i^{th}$ iteration; S42, calculating a parameter of the initial descattered image X, and according to a second type of the constraint condition, correcting a descattered image $X_{i-1}$ in the $(i-1)^{th}$ iteration by the atmospheric transmission matrix $A_i$ obtained in the step S41, to obtain a descattered image $X_i$ corrected by the current $i^{th}$ iteration; and S43, calculating the descattering model $\min\|AX-B\|_2$, and judging whether the descattering model satisfies the convergence condition: $\min\|AX-B\|_2 \leq \varepsilon$, wherein, A is the initial atmospheric transmission matrix, X is the initial descattered image of the foggy day image B, B is the foggy day image, and $\varepsilon$ is a deviation threshold; if the convergence condition is satisfied, ending an iteration process, to obtain the optimal atmospheric transmission matrix A* and the optimal descattered image X*; otherwise, repeating the steps S41~S42 until the convergence condition is satisfied.

Preferably, the first type of the constraint condition is: under the same shooting site, in a depth direction in space, the atmospheric transmission matrix remains unchanged in a spatial domain on the same depth layer; the second type of the constraint condition is: the parameters of the initial descattered image X are combined, the image quality of the current $i^{th}$ descattered image $X_i$ is evaluated, and an evaluation result is used as a condition for judging whether the descattered image corrected satisfies requirements; and the parameters are a contrast, an information entropy, a chromaticity, a brightness and a saturability.

Preferably, the method for correcting the atmospheric transmission matrix on each depth layer in the step S41 includes: respectively calculating a respective weight by the recovery quality of the atmospheric transmission matrix on the same depth layer to a scattering image in each area, and performing weighted fusion through the atmospheric transmission matrix on the same depth layer in each area and a calculated weight value to obtain the corrected atmospheric transmission matrix on this depth layer; and respectively performing a correction operation on the atmospheric transmission matrixes on the different depth layers.

Preferably, the acquisition method for the depth map T in the step S3 is one of light field depth estimation, dark channel prior depth estimation, depth data collection by a depth camera and depth data collection by a laser radar.

The beneficial effects of the present application include: the image descattering method based on the iterative optimization of the atmospheric transmission matrix provided by the present application is based on the atmospheric transmission matrix, the atmospheric transmission matrix and the descattered image are continuously optimized and updated by using an iterative method, and compared with the traditional algorithm that uses the simple model to directly solve so as to have the larger deviation, the image information on the different depth layers may be reconstructed better; and the descattered image obtained by the method provided by the present application has a small deviation from a real image, and the visual effect is improved.

These and other objectives of the present invention will no doubt become obvious to those of ordinary skill in the art after reading the following detailed description of the preferred embodiment that is illustrated in the various figures and drawings.

DETAILED DESCRIPTION

The present application is further described in detail below in combination with specific embodiments and with reference to drawings. It should be emphasized that the following description is exemplary only, and is not intended to limit a scope of the present application and an application thereof.

Non-restrictive and non-exclusive embodiments are described with reference to the following drawings, herein the same drawing sign represents a same component unless specifically stated otherwise.

Figure 1:
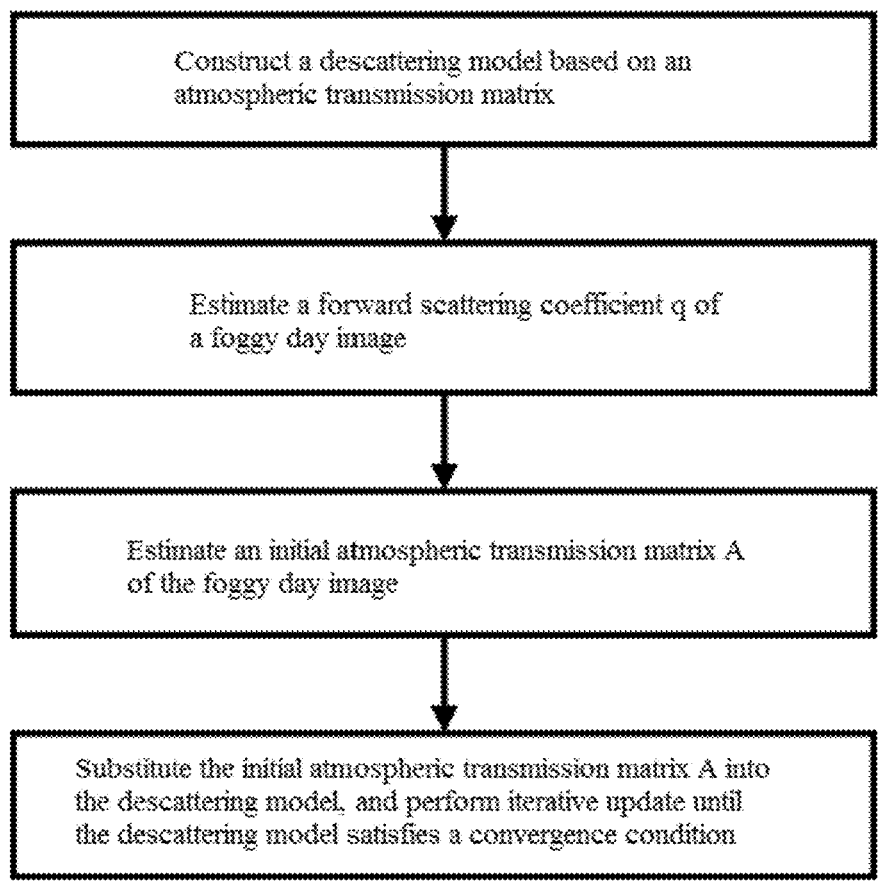
FIG. 1 is a flow schematic diagram of an image descattering method based on iterative optimization of an atmospheric transmission matrix of the present application.

A flow diagram of the method of the present application is shown in FIG. 1, and an image descattering method based on iterative optimization of an atmospheric transmission matrix includes the following contents:

S1, constructing a descattering model based on the atmospheric transmission matrix;

S2, estimating a forward scattering coefficient q corresponding to a foggy day image B;

S3, based on a depth map T of the foggy day image B and the forward scattering coefficient q obtained in the step S2, estimating an initial atmospheric transmission matrix A; and S4, substituting the estimated initial atmospheric transmission matrix A into the descattering model in the step S1, and performing iterative update under a constraint condition, until a value of the descattering model satisfies a convergence condition, to obtain an optimal atmospheric transmission matrix A* and an optimal descattered image X*. Compared with a traditional algorithm that uses a simple model to directly solve so as to have a larger deviation, the image descattering method provided by the present application uses the transmission matrix to represent a scattering medium, and uses an iterative method to continuously optimize and update the atmospheric transmission matrix and the descattered image, so image information on different depth layers may be reconstructed better, and the better image descattering effect is obtained.

In a more detailed embodiment, the image descattering method based on the iterative optimization of the atmospheric transmission matrix further includes the following contents.

The descattering model based on the atmospheric transmission matrix constructed in the step S1 is $\min\|AX-B\|_2$, herein A is the initial atmospheric transmission matrix, X is an initial descattered image of the foggy day image B, and B is the foggy day image. The acquisition method for the initial descattered image X of the foggy day image B is, but not limited to, one of a dark channel prior dehazing algorithm, a Haze-Line prior algorithm, a Retinex image enhancement algorithm and a Fusion algorithm. The initial descattered image X obtained by the above method is used as an initial input parameter of the descattering model.

The method for estimating the forward scattering coefficient q in the step S2 includes: S21, comparing the foggy day image B with the initial descattered image X, and analyzing to obtain an atmospheric type of a shooting site of the foggy day image B; and S22, using a fog concentration evaluation model (which is a fog concentration comparison table shown in Table 1 in this embodiment) to obtain the forward scattering coefficient q in the above shooting site.

TABLE 1

Fog concentration comparison table

| Atmospheric type | q |
|---|---|
| Sunny | 0.0-0.2 |
| Aerosol | 0.2-0.7 |
| Haze | 0.7-0.8 |
| Mist | 0.8-0.85 |
| Thick fog | 0.85-0.9 |
| Rain | 0.9-1.0 |

Specifically, the method for estimating the initial atmospheric transmission matrix A in the step S3 includes:

S31, constructing an atmospheric point spread function $APSF_{x_0y_0}$ of a pixel in the foggy day image B. In the foggy day image B as shown in a graph (a) of FIG. 2, herein the black point represents a selected pixel, and the corresponding atmospheric point spread function $APSF_{x_0y_0}$ (as shown in a graph (b) of FIG. 2) of the selected pixel is generated on the basis of depth information $T_{xy}$ corresponding to the selected pixel and the forward scattering coefficient q, namely one pixel in the foggy day image generates one atmospheric point spread function $APSF_{x_0y_0}$ correspondingly.

$$APSF_{x_0,y_0} = \frac{e^{-\frac{(x^2+y^2)^{\frac{kT_{xy}}{2}}}{\left|A\left(kT,\frac{1-q}{q}\right)\right|^{kT_{xy}}}}}{4\Gamma^2\left(1+\frac{1}{kT_{xy}}\right)A\left(kT_{xy},\frac{1-q}{q}\right)^2} \quad (1)$$

$$A(p,\sigma) = \left[\sigma^2 \Gamma\left(\frac{1}{p}\right) / \Gamma\left(\frac{3}{p}\right)\right]^{\frac{1}{2}} \quad (2)$$

Herein, $\Gamma(\cdot)$ is a gamma function, k is an adjustment factor, x and y are deviations between a pixel to be calculated and a center point coordinate, T is a depth map, $T_{xy}$ is the depth information corresponding to each pixel in the depth map T, q is the forward scattering coefficient, a function $A(\cdot)$ in Formula (1) is as shown in Formula (2), and p and σ are two input variables of the function $A(\cdot)$.

The acquisition method for the depth map T includes, but not limited to, one of light field depth estimation, dark channel prior depth estimation, depth data collection by a depth camera and depth data collection by a laser radar.

S32, performing sparsification on the atmospheric point spread function of the pixel. In a more detailed embodiment, the sparsification method is as follows: setting an extraction width, and center-extracting a new matrix from the generated atmospheric point spread function, herein a side length of the new matrix is equal to the set extraction width, as to achieve the sparsification of the atmospheric point spread function (a sparsification process is shown in a graph (b) of FIG. 2 to a graph (c) of FIG. 2, and after the sparsification, it is shown in the graph (c) of FIG. 2). A reason for the sparsification is that the energy of the atmospheric point spread function is often concentrated in a central area of the atmospheric point spread function, and the energy distribution in an edge area is less. Therefore, a sparsification operation may be performed on the atmospheric point spread function of each pixel point by setting a threshold, and this operation may reduce data storage space and computation burden.

Figure 2:
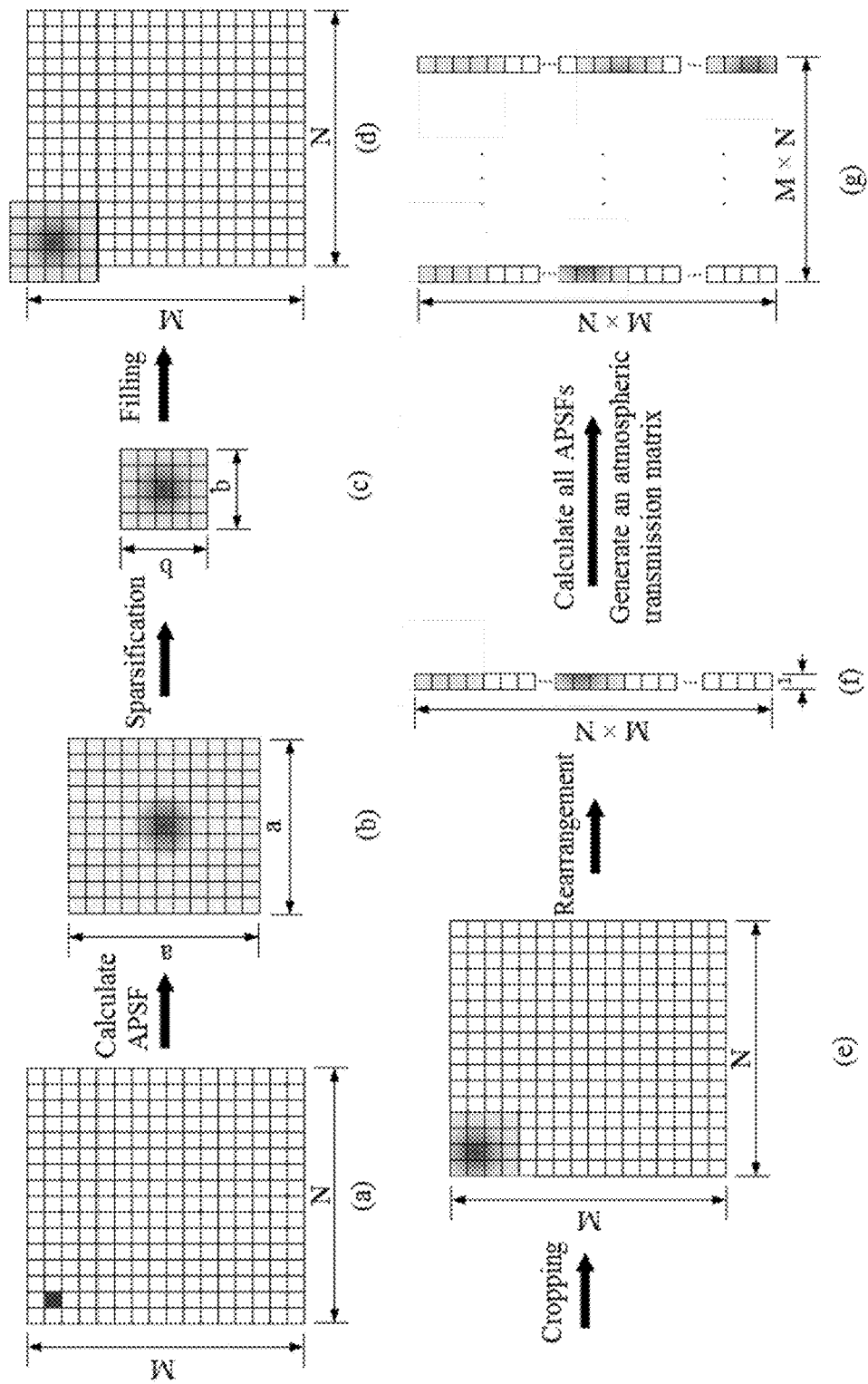
FIG. 2 is a flow schematic diagram of a generation method for an initial atmospheric transmission matrix of the present application.
Figure 3:
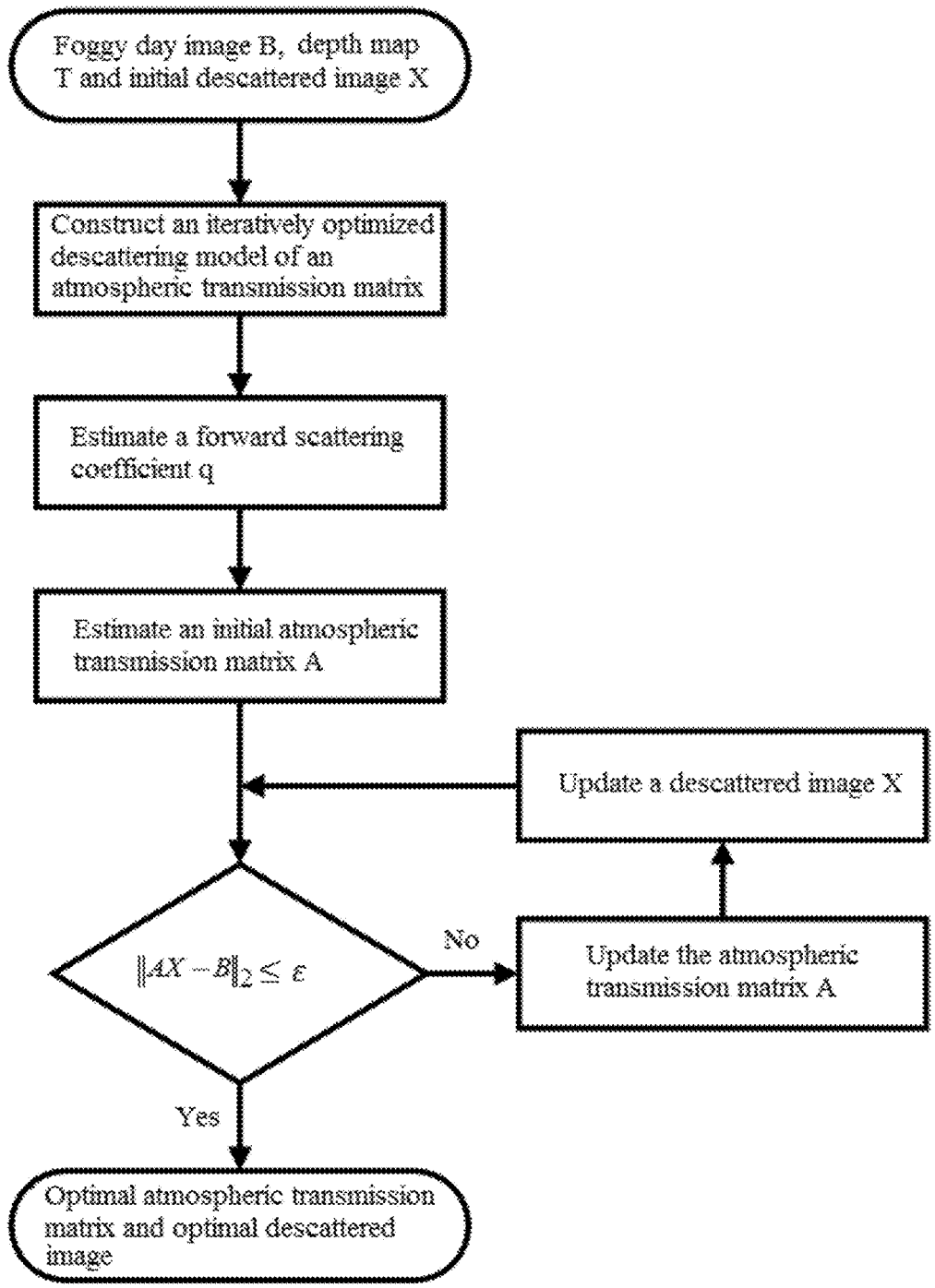
FIG. 3 is an algorithm flow diagram in the image descattering method based on the iterative optimization of the atmospheric transmission matrix of the present application.

S33, according to a coordinate of the pixel in the foggy day image B, filling a center point of the atmospheric point spread function after the sparsification corresponds to a pixel point in the corresponding foggy day image B, as shown in a graph (d) of FIG. 2; and cropping a part beyond the foggy day image B, and full-filling the rest part with a zero (as shown in a graph (e) of FIG. 2).

S34, expanding the calculated atmospheric point spread function of the pixel in columns, herein a method of expanding in columns is to connect a second column of the atmospheric point spread function after a first column, a third column is connected after the second column and so on, until the last matrix is expanded into a sequence of number, a schematic diagram of an expansion process thereof in columns is shown in the graph (e) of FIG. 2 to a graph (f) of FIG. 2, and a state after expansion is shown in the graph (f) of FIG. 2.

S35, repeating the steps S31~S34, to obtain the atmospheric point spread function of each pixel in the foggy day image B and expanding it respectively in columns.

S36, stacking all the columns in the step S35 according to a sequence of the pixels (as shown in a graph (g) of FIG. 2), and generating the initial atmospheric transmission matrix A, herein the sequence of the pixels refers to the columns according to the atmospheric point spread function, namely a first row of a first column, a second row of the first column, ..., a $n^{th}$ row of the first column, a first row of a second column, ..., a $n^{th}$ row of the second column and the like are stacked sequentially.

Specifically, the acquisition method for the optimal atmospheric transmission matrix A* and the optimal descattered image X* in the step S4 includes:

S41, according to a first type of the constraint condition, correcting the atmospheric transmission matrix on each depth layer, to obtain an atmospheric transmission matrix $A_i$ corrected by the current $i^{th}$ iteration. Specifically, the first type of constraint condition is that under the same shooting site, in the depth direction in space, the atmospheric transmission matrix remains unchanged in a spatial domain on the same depth layer. The specific correction method is: respectively calculating a respective weight by the recovery quality of the atmospheric transmission matrix on the same depth layer to a scattering image in each area, and performing weighted fusion through the atmospheric transmission matrix on the same depth layer in each area and a calculated weight value to obtain the corrected atmospheric transmission matrix on this depth layer; and respectively performing the above operation on the atmospheric transmission matrixes on the different depth layers. Herein, the acquisition method for the above weight includes: scoring the restoration quality of the image area in the same depth layer, and using the scoring to generate a weight.

S42, calculating a parameter of the initial descattered image X, and according to a second type of the constraint condition, correcting a descattered image $X_{i-1}$ in the $(i-1)^{th}$ iteration by the atmospheric transmission matrix $A_i$ obtained in the step S41, to obtain a descattered image $X_i$ corrected by the current $i^{th}$ iteration. Specifically, the second type of the constraint condition is: the parameters of the initial descattered image X are combined, the image quality of the current $i^{th}$ descattered image $X_i$ is evaluated, and an evaluation result is used as a condition for judging whether the descattered image corrected satisfies requirements; and the parameters include but are not limited to a contrast, an information entropy, a chromaticity, a brightness and a saturability. The correction method of this step is the same as that of the step S41.

S43, after substituting the initial atmospheric transmission matrix A, the initial descattered image X and the foggy day image B into the descattering model, calculating the descattering model $\min\|AX-B\|_2$, and judging whether the descattering model satisfies the convergence condition: $\min\|AX-B\|_2 \leq \varepsilon$, herein, A is the initial atmospheric transmission matrix, X is the initial descattered image of the foggy day image B, B is the foggy day image, and $\varepsilon$ is a deviation threshold; if the convergence condition is satisfied, ending an iteration process, to obtain the optimal atmospheric transmission matrix A* and the optimal descattered image X*; otherwise, repeating the steps S41~S42 until the convergence condition is satisfied.

Those skilled in the art may recognize that numerous modifications to the above description are possible, and thus the embodiments and drawings are intended only to describe one or more specific implementation modes.

Although what are considered to be exemplary embodiments of the present application are already described and narrated, it may be understood by those skilled in the art that various changes and replacements may be made to it without departing from the spirit of the present application. In addition, many modifications may be made to adapt a particular situation to the teachings of the present application without departing from a central concept of the present application described herein. Therefore, the present application is not limited to the specific embodiments disclosed herein, but the present application may also include all embodiments and equivalents thereof falling within a scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image descattering method based on iterative optimization of an atmospheric transmission matrix, comprising the following steps:
    S1, constructing a descattering model based on the atmospheric transmission matrix;
    S2, estimating a forward scattering coefficient q corresponding to a foggy day image B;
    S3, based on a depth map T of the foggy day image B and the forward scattering coefficient q obtained in the step S2, estimating an initial atmospheric transmission matrix A; and
    S4, substituting the estimated initial atmospheric transmission matrix A into the descattering model in the step S1, and performing iterative update under a constraint condition, until a value of the descattering model satisfies a convergence condition, to obtain an optimal atmospheric transmission matrix A* and an optimal descattered image X.

2. The image descattering method based on the iterative optimization of the atmospheric transmission matrix according to claim 1, wherein the descattering model in the step S1 is $\min\|AX-B\|_2$, wherein, A is the initial atmospheric transmission matrix, X is an initial descattered image of the foggy day image B, and B is the foggy day image.

3. The image descattering method based on the iterative optimization of the atmospheric transmission matrix according to claim 2, wherein the method for estimating the forward scattering coefficient q in the step S2 comprises:

S21, comparing the foggy day image B with the initial descattered image X, to obtain an atmospheric type of a shooting site of the foggy day image B; and
    S22, using a fog concentration evaluation model to obtain the forward scattering coefficient q.

4. The image descattering method based on the iterative optimization of the atmospheric transmission matrix according to claim 2, wherein the acquisition method for the initial descattered image X of the foggy day image B is one of a dark channel prior dehazing algorithm, a Haze-Line prior algorithm, a Retinex image enhancement algorithm and a Fusion algorithm.

5. The image descattering method based on the iterative optimization of the atmospheric transmission matrix according to claim 2, wherein the method for estimating the initial atmospheric transmission matrix A in the step S3 comprises:
    S31, constructing an atmospheric point spread function $APSF_{x_0 y_0}$ of a pixel in the foggy day image B:

$$APSF_{x_0,y_0} = \frac{e^{-\frac{(x^2+y^2)^{\frac{kT_{xy}}{2}}}{|A(kT,\frac{1-q}{q})|^{kT_{xy}}}}}{4\Gamma^2\left(1+\frac{1}{kT_{xy}}\right)A\left(kT_{xy},\frac{1-q}{q}\right)^2},$$

$$A(p,\sigma) = \left[\sigma^2\Gamma\left(\frac{1}{p}\right)\Big/\Gamma\left(\frac{3}{p}\right)\right]^{\frac{1}{2}}$$

wherein, $\Gamma(\bullet)$ is a gamma function, k is an adjustment factor, x and y are deviations of a pixel to be calculated and a center point coordinate, T is a depth map, $T_{xy}$ is depth information corresponding to a pixel in the depth map T, q is the forward scattering coefficient, and p and $\sigma$ are two input variables of a function $A(\bullet)$;

S32, performing sparsification on the atmospheric point spread function of the pixel;
    S33, according to a coordinate of the pixel in the foggy day image B, filling a center point of the atmospheric point spread function after the sparsification corresponds to a pixel point in the corresponding foggy day image B, cropping a part beyond the foggy day image B, and full-filling the rest part with a zero;
    S34, expanding the calculated atmospheric point spread function of the pixel in columns;
    S35, repeating the steps S31~S34, to obtain the atmospheric point spread function of each pixel in the foggy day image B and expanding it respectively in columns; and
    S36, stacking all the columns in the step S35 according to a sequence of the pixels, and generating the initial atmospheric transmission matrix A.

6. The image descattering method based on the iterative optimization of the atmospheric transmission matrix according to claim 5, wherein the method for performing the sparsification on the atmospheric point spread function of the pixel in the step S32 comprises:
    setting an extraction width, and center-extracting a new matrix from the generated atmospheric point spread function, wherein a side length of the new matrix is equal to the set extraction width, so as to achieve the sparsification of the atmospheric point spread function.

7. The image descattering method based on the iterative optimization of the atmospheric transmission matrix according to claim 2, wherein the step S4 comprises:

S41, according to a first type of the constraint condition, correcting the atmospheric transmission matrix on each depth layer, to obtain an atmospheric transmission matrix $A_i$ corrected by the current $i^{th}$ iteration;

S42, calculating a parameter of the initial descattered image X, and according to a second type of the constraint condition, correcting a descattered image $X_{i-1}$ in the $(i-1)^{th}$ iteration by the atmospheric transmission matrix $A_i$ obtained in the step S41, to obtain a descattered image $X_i$ corrected by the current $i^{th}$ iteration; and S43, calculating the descattering model $\min\|AX-B\|_2$, and judging whether the descattering model satisfies the convergence condition: $\min\|AX-B\|_2 \leq \varepsilon$, wherein, A is the initial atmospheric transmission matrix, X is the initial descattered image of the foggy day image B, B is the foggy day image, and $\varepsilon$ is a deviation threshold; if the convergence condition is satisfied, ending an iteration process, to obtain the optimal atmospheric transmission matrix A* and the optimal descattered image X*; otherwise, repeating the steps S41~S42 until the convergence condition is satisfied.

8. The image descattering method based on the iterative optimization of the atmospheric transmission matrix according to claim 7, wherein the first type of the constraint condition is: under the same shooting site, in a depth direction in space, the atmospheric transmission matrix remains unchanged in a spatial domain on the same depth layer; the second type of the constraint condition is: the parameters of the initial descattered image X are combined, the image quality of the current $i^{th}$ descattered image $X_i$ is evaluated, and an evaluation result is used as a condition for judging whether the descattered image corrected satisfies requirements; and the parameters are a contrast, an information entropy, a chromaticity, a brightness and a saturability.

9. The image descattering method based on the iterative optimization of the atmospheric transmission matrix according to claim 7, wherein the method for correcting the atmospheric transmission matrix on each depth layer in the step S41 comprises: respectively calculating a respective weight by the recovery quality of the atmospheric transmission matrix on the same depth layer to a scattering image in each area, and performing weighted fusion through the atmospheric transmission matrix on the same depth layer in each area and a calculated weight value to obtain the corrected atmospheric transmission matrix on this depth layer; and respectively performing a correction operation on the atmospheric transmission matrixes on the different depth layers.

10. The image descattering method based on the iterative optimization of the atmospheric transmission matrix according to claim 1, wherein the acquisition method for the depth map T in the step S3 is one of light field depth estimation, dark channel prior depth estimation, depth data collection by a depth camera and depth data collection by a laser radar.

* * * * *